United States Patent Office 2,897,166
Patented July 28, 1959

2,897,166

PROCESS FOR THE PREPARATION OF COATING OF SOFT RESINS FROM POLYISOCYANATES AND COMPOUNDS CONTAINING HYDROXYL GROUPS

Kurt Eitel and Fritz Schmidt, Leverkusen, and Gustav Mauthe, Opladen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Application November 5, 1954
Serial No. 467,216

Claims priority, application Germany November 6, 1953

6 Claims. (Cl. 260—22)

The present inventon relates to products provided with high luster coatings and to a composition and method of producing same.

In the present invention the term "polyfunctional hydroxyl soft resin" is used to designate soft resins, such as polyesters, polyethers, epoxy resins and hydrogenated copolymers of carbon monoxide and ethylene, which contain free hydroxyl groups.

It is known that high-luster coatings may be produced on surfaces or films by application of solutions of polyfunctional isocyanates and polyfunctional hydroxyl soft resins either mechanically or by hand with plush, brush or spray gun.

After reaction of the isocyanate with the soft resin and cross-linking, the resulting film possesses, above all, an excellent high gloss, good cohesiveness, good mechanical properties, good resistance to high and low temperatures and good resistance to chemical reaction.

This process has the disadvantage that the flow of the film is highly unsatisfactory, especially on porous or very elastic surfaces. Irregularities in the surface occur which are called "craters" in the lacquer industry. The formation of craters is due to inadequate removal of water, amine or alcohol, to residual moisture left by drying the films in moisture saturated atmosphere, to the water content of the compressed air and the like. It has been determined that even after removal of the aforementioned factors, the same tendency to crater formation is caused by the properties of the substrata.

In German Patent 870,479, a process is described for the preparation of coatings with smooth surfaces from polyisocyanates and soft resins containing reactive hydrogen atoms by adding nitrocellulose solutions to the lacquer mixture.

Without a doubt this process offers a certain improvement in the flow properties of the polyisocyanate-soft resin films. However, the film formation of the lacquer solutions, particularly on very flexible or porous materials such as leather, is still always unsatisfactory and gives rise to crater formation. Likewise, the mechanical properties, the cold resistance and the luster of the films are markedly reduced by the addition of nitrocellulose so that the valuable properties of the polyisocyanate-soft resin combination are masked in an undesirable manner.

A particular disadvantage is the fact that the addition of collodion causes an undesirable hardening of the film, which makes the lacquer compositon described in said patent of no interest, for instance, for use on leather.

It has now been found that by the addition of small quantities of emulsifiers soluble in organic agents, the flow properties of the polyisocyanate-soft resin coatings are improved so satisfactorily that high luster, smooth, crater-free films are produced, not only on smooth surfaces, such as metal, glass, plastics, etc., but also on porous materials such as paper, wood, leather, fabrics and the like.

As emulsifiers within the scope of the invention are metal soaps of tri- or higher valent metals, especially those of titanium and zirconium. Representative examples of metal soaps of tri- or higher valent metals, which may be used in the practice of the invention, include titanium and zirconium palmitate, -stearate, -oleate and the corresponding salts of soap-forming fatty acids obtained from natural oils and fats or prepared by the oxydation of paraffin. These metal soaps are preferably used in an amount ranging from about 0.1 to about 3% based on the amount of polyfunctional hydroxyl soft resin.

In contrast to the addition of nitrocellulose solutions, these auxiliary agents, active in minute quantities, in no way increase the hardness of the resulting films, but produce much softer and more elastic films which ensure the desired soft feel (or hand) of the coated materials. The films thus produced attain a degree of cold resistance which makes the polyisocyanate-soft resin lacquers valuable for so many uses.

Example 1

50 parts by weight of a polyester prepared from 3 moles adipic acid, 1 mole hexanetriol and 3 moles butylene glycol is dissolved in 150 parts butyl acetate and 20 parts cyclohexanone, colored with 0.5 part of an alcohol-soluble black dye and treated with 1 part of the reaction product of 1 mole zirconium oxychloride with 2 moles of the sodium salt of coconut oil fatty acid (dried at 150° C.) dissolved in toluene. To this homogeneous composition is added 75 parts of a 75% solution of the reaction product of 3 moles toluylene diisocyanate with 0.6 mole hexanetriol and 0.6 mole 1,3-butylene glycol disoslved in 125 parts toluene. The lacquer is then brushed or sprayed on calf leather in the usual manner. After drying overnight between 20 and 40° C., a lacquered leather with a high luster and good wearing properties is obtained. The excellent flow of the lacquer film is especially apparent.

Example 2

A smooth polished piece of leather, after removal of bits of grinding material in the usual manner, is treated with a commercial leather coloring matter containing a pigment and a polymer as a binder, calendered at 60° C. and 200 atm. and coated with a spray gun until it is completely sealed. Finally it is calendered at 60° C., 150 atm. and coated by means of a spray gun with the lacquer composition described in Example 1. However, this lacquer composition contains, instead of the zirconium soap used in Example 1, 0.7 part of the reaction product of 1 mole of butyl ortho-titanate with 4 moles of a fatty acid. In contrast to the lacquer coating obtained without the titanium soap acting as a flowing agent, the surface is smooth and the luster effect considerably improved by the use of the above composition.

Example 3

Strong wrapping paper is primed by means of a spray gun or coating machine with an emulsion of a copolymer of butadiene and acrylonitrile colored with an acid or substantive dye, dried, and pressed by passing through a calender at high temperatures. The paper thus treated is then coated by means of a coating machine or automatic sprayer with the following lacquer composition:

100 parts of a polyester of:
    3 moles adipic acid
    1 mole triol and
    3 moles butylene glycol
200 parts butyl acetate
120 parts of the reaction product of:
    3 moles toluylene diisocyanates with
    0.6 mole hexanetriol and
    0.6 mole butylene glycol
200 parts toluene
0.7 part of the reaction product of:
    1 mole zirconium oxychloride with
    1.8 mole sodium salt of coconut oil fatty acid which is dried at 130–150° C.
1 part of an alcohol-soluble dye.

This yields an imitation lacquered leather with excellent surface covering and the desired lacquer effect.

Equally good effects on cotton twill fabric can be obtained with the same composition and procedure if to the final coating based on polyester and isocyanates, one of the above-mentioned metallic soaps is added as a flowing agent.

*Example 4*

A lacquer for wood with good adhesion and excellent flow has the following composition:

12.5 parts by weight of a condensation product of:
    2.5 mole adipic acid
    0.5 mole phthalic acid and
    4.1 mole trimethylol propane
3.1 parts by weight of a condensation product of:
    3 moles adipic acid
    2 moles 1,4-butylene glycol
    2 moles hexanetriol
7.8 parts by weight toluylene diisocyanate
75.6 parts by weight of a solvent mixture of:
    ethyl acetate-toluene, butyl acetate-glycol-methyl ether acetate 5:2:2:1
1 part by weight of the reaction product of:
    1 mole butyl o-titanate with
    4 moles first runnings fatty acids The lacquer mixture is applied with a spray gun, and an excellent, smooth coating results. A similar lacquer composition may also be employed for coating metals, plastics and similar objects.

What is claimed is:

1. A process which comprises applying to a porous surface a solution in an inert organic solvent of a polyisocyanate, a soft polyfunctional resin comprising a polyester prepared from a polybasic carboxylic acid and a substantial excess of a polyhydric alcohol and a metallic soap selected from the group consisting of titanium and zirconium metallic soaps, and subsequently allowing the solution applied to said surface to dry to thereby obtain a high luster, smooth, crater-free coating.

2. A coating composition suitable for use with porous and flexible articles which comprises a solution containing a polyisocyanate, a soft polyfunctional resin comprising a polyester prepared from a polybasic carboxylic acid and a substantial excess of a polyhydric alcohol, a metallic soap selected from the group consisting of titanium and zirconium metallic soaps, and an inert organic solvent.

3. A coating composition as defined in claim 2 in which said hydroxyl polyester is produced from adipic acid, hexanetriol and butylene glycol.

4. A coating composition as defined in claim 2 in which said hydroxyl polyester is produced from adipic acid, phthalic acid and trimethylol propane.

5. A porous surface provided with a coating composition as defined in claim 2.

6. A method for coating surfaces which comprises applying thereto a solution containing an organic polyisocyanate and a polyester, prepared from a polybasic carboxylic acid and a substantial excess of a polyhydric alcohol, dissolved in an inert organic solvent therefor and a soap of a metal selected from the group consisting of titanium and zirconium.

References Cited in the file of this patent

UNITED STATES PATENTS

| | | |
|---|---|---|
| 2,374,136 | Rothrock | Apr. 17, 1945 |
| 2,577,280 | Simon et al. | Dec. 4, 1951 |
| 2,621,193 | Langkammerer | Dec. 9, 1952 |
| 2,755,266 | Brenschedd | July 17, 1956 |